Figure 1:
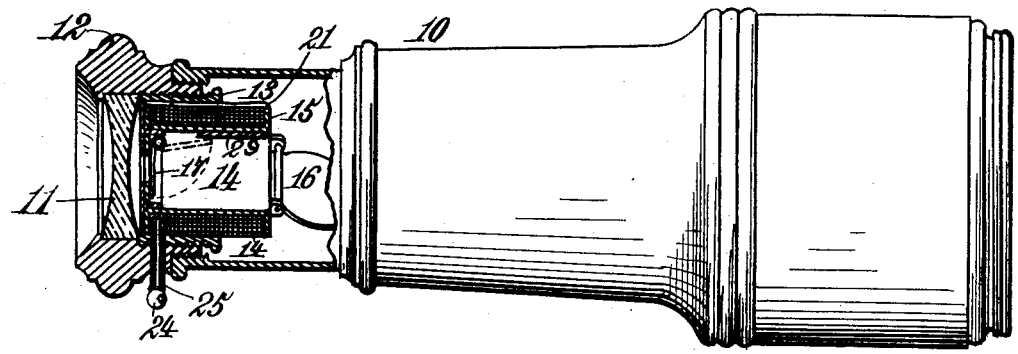

No. 709,837. Patented Sept. 23, 1902.
W. B. WHEELER.
ELECTRICALLY CONTROLLED OPTICAL APPLIANCE.
(Application filed May 9, 1902.)
(No Model.)

Witnesses,

Inventor.
Webster B. Wheeler.
By James L. Norris
Atty.

UNITED STATES PATENT OFFICE.

WEBSTER B. WHEELER, OF FULLERTON, NEBRASKA.

ELECTRICALLY-CONTROLLED OPTICAL APPLIANCE.

SPECIFICATION forming part of Letters Patent No. 709,837, dated September 23, 1902.

Application filed May 9, 1902. Serial No. 106,630. (No model.)

*To all whom it may concern:*

Be it known that I, WEBSTER B. WHEELER, a citizen of the United States, residing at Fullerton, in the county of Nance and State of Nebraska, have invented new and useful Improvements in Electrically-Controlled Optical Appliances, of which the following is a specification.

This invention relates to an electrically-controlled optical appliance which may be used in many different ways. For example, it may be employed in connection with coin-controlled mechanism—such, for example, as illustrated by Letters Patent No. 664,343, granted to me December 18, 1900.

My invention comprehends, broadly, a part having a bore and a sight-controller for said bore in conjunction with a solenoid adapted when energized to operate such sight-controller, the latter consisting usually of a pivotally-mounted shutter or flap provided with a core for said solenoid. In the coin-operated opera-glass disclosed by the patent aforesaid I operate the sight controller or shutter by an electromagnet, the circuit in which said magnet is situated being closed through means actuated by a coin. In practice I have found that there is a tendency at times to jar the glasses to such an extent as to move the armature away from the magnet while the same is energized, and when the glasses are held in a certain position the magnet cannot attract its armature, so that the shutter cannot be opened. By virtue, however, of my improvements these obstacles are overcome, and in order to secure the best efficiency I inclose the shutter in the solenoid and in this way also economize space. The instant that the solenoid is energized it attracts its armature on the shutter, so as to open the said shutter, whereby an unobstructed vision may be had through the bore which said shutter controls, provided, of course, another shutter or shutters, also controlling the said bore, are open, notwithstanding the position the glasses may occupy, and this relation will be maintained as long as the solenoid is energized, and in order to positively hold the electrically-governed shutter against vibration while the circuit is closed, I provide a strip of soft iron longitudinally of the solenoid and interiorly thereof, which is magnetized on the energization of the solenoid and against which the electrically-operated shutter abuts when the same is opened, so as to uphold the latter and against any movement whatsoever. When, however, the circuit is broken, said electrically-operated shutter is released and in the present case is closed by gravity.

The invention is clearly illustrated in the accompanying drawings, forming a part of this specification, and in which—

Figure 4:
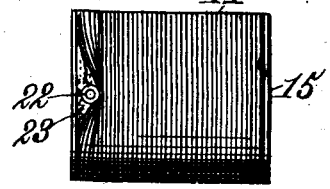
Figure 2:
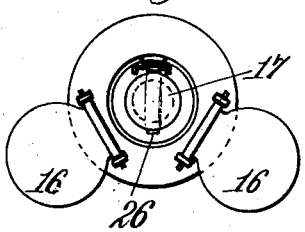
Figure 3:
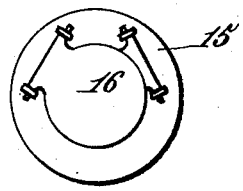
Figure 5:
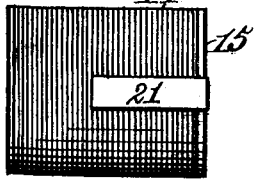
Figure 7:
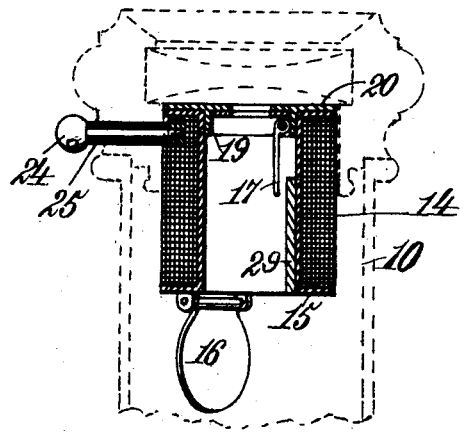
Figure 6:
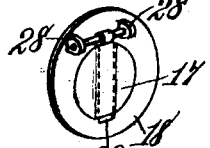

Figure 1 is a sectional side elevation of an opera-glass including my invention. Fig. 2 is an outside face view of the shutter mechanism, showing the outer shutters open and the inner one closed. Fig. 3 is a similar view showing the said outer shutters closed. Fig. 4 is a bottom plan view of the solenoid. Fig. 5 is a top plan view of the same. Fig. 6 is an outside perspective view of the inner shutter and its support. Fig. 7 is a vertical central sectional elevation of the parts contained in one of the barrels of the glass, the inner end of such barrel being shown by dotted lines and all the shutters being represented as open.

Like characters refer to like parts in all the figures.

In Fig. 1 I have represented in sectional elevation one of the barrels of an opera-glass in which the mechanism hereinafter described is located, it being understood that the companion barrel incloses similar mechanism, although in the case of the telescope or microscope it is not necessary to duplicate the mechanism. Said barrel (also shown partly and by dotted lines in Fig. 7) is denoted by 10, and its bore receives the different parts of the said mechanism. The inner lens is denoted by 11, and it fits within the tube 12, the latter in turn being introduced into the inner or reduced end of the barrel 10 and suitably held therein, for example, by means of a screw-thread connection. The lens-tube 12 at its outer end receives by means of a screw-thread joint the tube 13, abutting at its inner end the lens 11, said last-mentioned tube being smooth interiorly and being adapted to receive the solenoid 14. The spool of the solenoid is denoted by 15, and its outer head supports the swinging gravitative shutters 16, which when shut cover the outer end of the solenoid 14, as shown in Fig. 3, and one of which overlies the other. A third shutter is shown at 17, and it governs the inner end of the solenoid, it being also of the swinging gravitative type. The third or inner shutter is pivotally supported by the centrally-apertured disk 18, which closely fits within the annular flange 19, fitting snugly in the inner end of the spool 15 of the solenoid. Said flange 19 extends outward from the circular plate 20, which abuts against the inner head of the said spool, the central orifice in the disk 18 registering with a similar central orifice in said plate 19, the two orifices constituting, in effect, part of the bore of the barrel 10. The axes of the swinging shutters 16 are oblique to the horizontal axis of the shutter 17 when the barrel is held in proper horizontal position and converge downward, whereby when the barrel is held in the vertical position shown in Fig. 7 all the shutters will be swung open automatically in the manner set forth by the Letters Patent hereinbefore mentioned. When the barrel 10 is put into its proper position, as shown by Fig. 1, the outer shutters will be opened by their own weight; but the inner shutters will be closed, and when such position is reversed the outer shutters will be closed and the inner one will be opened, or when turned sidewise, the shutters 16 being mounted as shown, one or the other of them will be closed, so that it is not possible to open the three shutters simultaneously by the simple turning of the barrel. With the barrel in its correct position for viewing, or that represented by said Fig. 1, it will be seen that the outer shutters are open while the inner one is closed, as shown by full lines. In order, therefore, to obtain an unobstructed view through the barrel, it will be necessary to open the inner shutter, and this I secure by the energization of the solenoid, the said inner shutter carrying a core for said solenoid, which core is in the magnetic field of such solenoid, as will hereinafter appear.

The barrel 10 of the glasses is connected by suitable conductors with a source of electric energy (not shown) and is of metal, so that when the solenoid is fitted in place, as indicated in Fig. 1, the current can pass from the solenoid direct to the barrel, the latter, as will be understood, forming part of the circuit. In case of any imperfection in fit, however, I provide means for insuring proper contact between the solenoid and the barrel. I secure to the outer head of the latter a spring contact or finger 21, Fig. 5, which when the solenoid is inserted in the tube 13 is adapted to bear against the inner surface of said tube, so as to insure proper flow of the current. A block 22 of conducting material is connected with one end of the wire coil of the solenoid, the opposite end of the wire being connected with the spool of the solenoid. The said block 22 is embedded in the coil of the solenoid and is insulated by suitable material, as 23, Fig. 4, from the adjacent head of the solenoid-spool 15. The said block receives the inner threaded end of the binding-post 24, passing through registering perforations in the tubes 12 and 13, and to insulate it from said tubes the binding-post or pin is surrounded by a jacket or covering 25 of insulating material of some suitable kind. This binding-post is connected by means of a flexible conductor (not shown) with a battery or its equivalent, to which, it will be remembered, the metallic barrel 10 of the glass is also connected. When the circuit including these parts is closed, the solenoid will be energized, and the closing of such circuit takes place by coin-controlled means, which may be of the kind set forth in my aforesaid prior Letters Patent, or said circuit may be closed in any other suitable manner. The shutter 17, it will be remembered, carries a core for the solenoid, and said core is denoted by 26, it consisting of a very thin strip of soft iron suitably fastened to and depending from the rock-shaft 27, sustained by the lugs or ears 28 on the disk 18 and covered by disks of opaque paper or the like. The core is shown by dotted and full lines in Fig. 6, the full-line part thereof being a short portion that extends below the opaque disks. It will be understood, therefore, that the shutter 17 carries a core for the solenoid, said shutter being in the present case located inside of said solenoid. The axis of the said shutter 17, when the barrel 10 is held in position for viewing, as shown by Fig. 1, is horizontal and in proximity to the upper side of the spool 15 of the solenoid, so that the instant said solenoid is energized the armature thereof will be attracted, whereby the shutter will be swung upward or opened, as shown by dotted lines in Fig. 1, this relation being continued as long as the circuit is closed. As soon, however, as the circuit is broken the said shutter is free to drop down by its own weight to the closed position thereof.

In order to hold the shutter 17 open against vibration when electrically operated or when the battery-power is low, I secure to the inner surface of the solenoid-spool 15 the longitudinal soft-iron strip 29, which is parallel with the axis of the solenoid and which is in the plane of the axis of said shutter. When the current passes through the solenoid the same is energized and the strip 29 is magnetized, so that when the short projecting end of the core 26 strikes the outer end of the magnetized strip such core, and hence the shutter, is firmly held against vibration. When all the shutters are open, an unobstructed view can be had through the bore of the barrel 10. Not only am I enabled to hold the shutter 17 open by the use of a solenoid and against accidental return, no matter how roughly the barrel 10 may be handled, while said solenoid is energized, but the latter, with the parts carried thereby, can be slipped into opera-glasses or like articles without any change whatsoever in their construction for this purpose. Besides this, the solenoid constitutes an effective carrier for the shutters.

This invention may be modified within the scope of the following claims.

Having described the invention, what I claim is—

1. In an electrically-controlled optical appliance, a barrel having a shutter carrying a core, and a solenoid, the core being attracted by said solenoid when the latter is energized to thereby operate said shutter.

2. In an electrically-controlled optical appliance, a barrel having a shutter, and a solenoid, a core for said solenoid, carried by said shutter, and an iron strip connected with and adapted to be magnetized by said solenoid and being adapted to be engaged by said core when the same is attracted by the solenoid.

3. In an electrically-controlled optical appliance, a barrel having a shutter controlling the bore of said barrel, and a solenoid, a core for the solenoid carried by the shutter, and means independent of said shutter for also controlling the bore.

4. In an electrically-controlled optical appliance, a barrel having an oscillatory shutter controlling the bore of said barrel, and a pair of oscillatory shutters movable about axes diagonal to the axis of the other shutter, the axes of the two shutters converging toward each other.

5. In an electrically-controlled optical appliance, a barrel having an oscillatory shutter controlling the bore of said barrel, a pair of oscillatory shutters movable about axes diagonal to the axis of the other shutter the axes of the two shutters converging, toward each other, and means for positively operating the first-mentioned shutter.

6. In an electrically-controlled optical appliance, a barrel having an oscillatory shutter controlling the bore of said barrel, a pair of oscillatory shutters movable about axes diagonal to the axis of the other shutter, the axes of the two shutters converging toward each other, and a solenoid and its core, the latter being carried by the first-mentioned shutter.

7. In an electrically-controlled optical appliance, a barrel, a shutter for controlling the same, a solenoid inclosing said shutter, and a core for the solenoid carried by said shutter.

8. In an electrically-controlled optical appliance, a barrel, a solenoid in the barrel, a shutter controlling the bore of the barrel and carrying a core for said solenoid, and an iron strip extending longitudinally of the solenoid interiorly of the same, said strip being adapted to be magnetized when the solenoid is energized and serving to hold the core when the same is attracted by said solenoid.

9. In an electrically-controlled optical appliance, a barrel, a shutter for controlling the bore of the barrel, an apertured disk carrying said shutter, a circular plate provided with a flange to receive said apertured disk, also having an aperture in registration with that of the disk, a solenoid into which said flange is fitted, and a core for the solenoid carried by the shutter.

10. In an electrically-controlled optical appliance, a barrel having a solenoid provided exteriorly with a spring-finger adapted to engage the barrel, an apertured plate fitted against one end of the solenoid and having a circular flange fitted in said solenoid, a disk fitted in said circular plate, a shutter pivotally supported by said disk, carrying a core for the solenoid, a binding-post embedded in the coil of the solenoid and insulated from the barrel, and an iron strip in the solenoid adapted to be engaged by the core of said shutter.

In testimony whereof I have hereunto set my hand in presence of two subscribing witnesses.

WEBSTER B. WHEELER.

Witnesses:
   HEATH SUTHERLAND,
   EWELL A. DICK.